United States Statutory Invention Registration [19]

[11] Reg. Number: H827

Yamagishi. [43] Published: Oct. 2, 1990

[54] PROCESS FOR MANUFACTURING MOLDED OUTER COVERING

[76] Inventor: Kouichi Yamagishi, 16-4, Agarito, Furui-cho, Anjyo-shi, Aichi-ken, Japan

[21] Appl. No.: 731,643

[22] Filed: May 7, 1985

[30] Foreign Application Priority Data

May 16, 1984 [JP] Japan ..... 59-98383

[51] Int. Cl.[5] ..... B29C 41/22; B29C 69/00

[52] U.S. Cl. ..... 264/73; 264/74; 264/77; 264/245; 264/246; 264/247; 264/126

[58] Field of Search ..... 264/73, 74, 77, 245, 264/246, 247, 126

[56] References Cited

U.S. PATENT DOCUMENTS 3,414,642 12/1968 Baum ..... 264/73
4,175,050 11/1979 Carduck et al. ..... 264/245

FOREIGN PATENT DOCUMENTS 52-12265 1/1977 Japan ..... 264/73
56-95675 8/1981 Japan ..... 264/73

OTHER PUBLICATIONS

Zimmerman et al. (Zimmerman), "molding powdered polyethylene", *Modern Plastics Encyclopedia Issue for 1963,* vol. 40, No. 1A, pp. 717–720 (Sep. 1962).

*Primary Examiner*—Matthew A. Thexton
*Assistant Examiner*—Philip Tucker

[57] ABSTRACT

A process for manufacturing a molded outer covering, comprising the steps of mixing two or more powder resin materials having different colors at a desired mixing ratio to prepare a powder mixture, and then heating the powder mixture in a preheated molded die, so that the powder mixture melts, resulting in a formation of a molded product having a pepper and salt pattern on the outer surface thereof.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MANUFACTURING MOLDED OUTER COVERING

BACKGROUND OF THE INVENTION

1. Field of the Invention

The present invention relates to a process for manufacturing a molded outer covering, in particular having an outer surface with a pepper and salt pattern having different colours.

2. Description of the Related Art

Various interior devices of an automobile, such as an instrument panel, or outer surface of a door trim or an interior ceiling are usually covered with an outer covering to provide a comfortable compartment to a driver or passanger.

Known outer coverings for an automobile are usually made of a plastic sheet which is, in turn, made by a calendar machine and which is molded into a desired shape in a vacuum forming process or the like.

However, it is only possible to make a plastic outer covering having a single colour or a few limited colours by the vacuum process of a plastic sheet, and accordingly, molded products obtained often result in lack of variety in colour and pattern. Furthermore, a compartment of an automatic tends to become dirty or unclean by mud or dust which enters the compartment when a door of the automobile is opened or closed or when a passanger gets in or out of the automobile. In addition to the foregoing, the plastic product tends to become charged with static electricity, so that the dust or dirt can be easily applied to the outer surfaces of the plastic product. The applied dust or the dirt is conspicuous, in view of the lack of variety in the colour or pattern of the plastic covering, thus resulting in a bad influence on the aesthetic impression of the compartment.

SUMMARY OF THE INVENTION

The primary object of the present invention is to eliminate the drawbacks mentioned above by providing a process for manufacturing an outer covering suitable for interior devices or interior surfaces of an automobile, in which a covering having desired patterns and colours can be easily obtained.

Namely, the object of the present invention is to provide an improved process for manufacturing an outer covering which has a decorative and aesthetic appearance with a pepper and salt pattern having different colours and in which dust or dirt even if adhered to the outer surface of the covering is not conspicuous.

Another object of the present invention is to provide a process for manufacturing a relatively thin and soft molded product which is agreeable to the touch and which can be advantageously used as an outer covering.

Still another object of the present invention is to provide a manufacturing process in which an outer covering having a desired shape or profile can be easily and effectively obtained.

In order to achieve the objects mentioned above, according to the present invention, there is provided a process for manufacturing an outer covering, comprising the steps of mixing two or more powder resin materials having different colours at a desired mixing ratio to make a single powder mixture, and then heating the powder mixture thus obtained in a preheated molding die to melt the mixture thereby to obtain a molded outer covering which has a pepper and salt pattern having different colours on its outer surface.

The invention will be described in detail below with reference to the accompanying drawings, in which.

DESCRIPTION OF THE PREFERRED EMBODIMENTS

Figure 1:
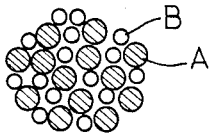
FIG. 1 is a schematic view of a powder mixture of which an outer covering of the present invention is made.

FIG. 1 schematically shows a powder mixture of which an outer covering can be made. The powder mixture is made of two or more powder resin materials A, B, . . . having different colours which are mixed at a desired mixing ratio. The powder resin materials A, B, etc. can be identical to each other, for example, both soft polyvinyl chloride (PVC) or its copolymers.

Alternatively, the powder resin materials may be different from or similar to each other, for example one is PVC and the other is PVC copolymer. The powder resin materials have different colours.

The difference in hue and brightness between the colours of the powder resin materials depends on design choice, in accordance with patterns to be formed on an outer surface of a product.

Preferably, the powder resin materials have different grain sizes.

If the powder resin materials are both PVC powders, fundamentally the melting temperatures of the powders depend on degree of polymerization of the copolymer or the amount of copolymer, etc. Accordingly, PVC powders having different melting temperatures can be easily obtained, for example, by selecting the degree of polymerization of the powders.

Preferably, the melting temperatures of PVC powders used in the present invention are 160° C. to 220° C. As will be apparent later, the melting temperatures of PVC powder used in the present invention are determined by selecting a mean degree ($\overline{P}$) of polymerization thereof. Additives, such as plasticizers, stabilizers, fillers, etc. can be kneaded in PVC powders, together with stains or colouring agents.

The sizes of grains of PVC powders used in the present invention are approximately 50μ to 200μ. By using a screening means, PVC powders having different grain sizes (diameters) can be easily obtained.

These powder resin materials are mixed at a desired mixing ratio to make a single powder mixture, in accordance with a property of matter or appearance of a product.

The following are six examples of powder mixtures which can be advantageously used in the present invention. Note, the powder resin materials A, B and C in the examples are all PVC's.

EXAMPLE 1

| | A | B |
|---|---|---|
| colour | white | light brown |
| mixing ratio (by weight) | 1 | 1 |
| mean degree of polymerization ($\overline{P}$) | 1030 | 1030 |
| melting temperature | 180° C. | 180° C. |

-continued

| | A | B |
|---|---|---|
| mean grain size | 150μ | 150μ |

EXAMPLE 2

| | A | B | C |
|---|---|---|---|
| colour | red | yellow | brown |
| mixing ratio (by weight) | 2 | 1 | 7 |
| mean degree of polymerization $(\overline{P})$ | 1030 | 1030 | 1030 |
| melting 180° C. | 180° C. | 180° C. | |
| mean grain size | 150μ | 150μ | 150μ |

EXAMPLE 3

| | A | B | C |
|---|---|---|---|
| colour | red | yellow | brown |
| mixing ratio (by weight) | 2 | 1 | 7 |
| mean degree of polymerization $(\overline{P})$ | 1030 | 1030 | 780 |
| melting temperature | 180° C. | 180° C. | 160° C. |
| mean grain size | 150μ | 150μ | 150μ |

EXAMPLE 4

| | A | B | C |
|---|---|---|---|
| colour | red | yellow | brown |
| mixing ratio (by weight) | 2 | 1 | 7 |
| mean degree of polymerization $(\overline{P})$ | 1300 | 1300 | 1030 |
| melting temperature | 200° C. | 200° C. | 180° C. |
| mean grain size | 150μ | 150μ | 150μ |

EXAMPLE 5

| | A | B |
|---|---|---|
| colour | white | brown |
| mixing ratio (by weight) | 1 | 2 |
| mean degree of polymerization $(\overline{P})$ | 1030 | 1030 |
| melting temperature | 180° C. | 180° C. |
| mean grain size | 80μ | 180μ |

EXAMPLE 6

| | A | B |
|---|---|---|
| colour | white | gray |
| mixing ratio (by weight) | 1 | 4 |
| mean degree of polymerization $(\overline{P})$ | 1300 | 1030 |
| melting temperature | 200° C. | 180° C. |
| mean grain size | 180μ | 80μ |

Figure 2:
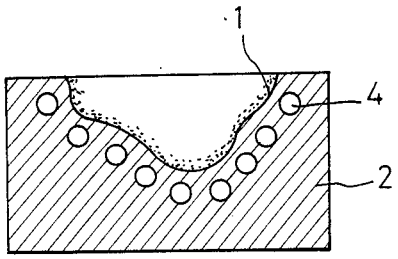
FIG. 2 is a sectional view of a molding die in which the powder mixture is charged; and, FIG. 3 is an enlarged schematic view of a molded product, i.e. an outer covering manufactured by the present invention.
Figure 3:
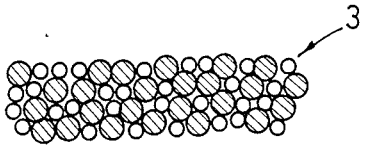

A predetermined amount of the powder mixture as mentioned above is loaded in a molding die 2 which has a cavity 1 of a desired shape, as shown in FIG. 2.

The molding die 2 is preheated at a predetermined temperature (150°~200° C.), so that the powder mixture loaded in the die 2 can be heated with the result that the powder mixture melts and the grains of the powder are adhered to each other. An excess of powder is removed from the die.

After that, a further heating of the die 2 takes place for a predetermined time to heat the powder, by means of a heating device 4 which will be described hereinafter, resulting in a complete adhesion of the grains and also in the formation of a desired thickness of molten resin layer. If necessary, the die 2 can be rotated or revolved to provide a uniform adhesion of the grains of the powder.

After that the die 2 is cooled to cure the resin layer, so that a cured outer covering made of a resinous sheet having a desired shape can be obtained.

In the manufacturing process mentioned above, according to the present invention, the powder resin materials to be mixed have different colours and preferably different melting temperatures and/or different grain sizes, and, accordingly, the outermost surface of the molded product 3 coming into contact with the surface of the die cavity 1 has the appearance of the mixed resin materials used. Consequently, the appearance of the product has a pepper and salt pattern which is produced by the difference in the melting temperature, color, and grain size between the resin materials to be mixed and in which some of the grains clearly appear and others do not.

In FIG. 2, the heating device 4 is provided in the die 2 and is preferably in the form of a sheathed heater. The sheathed heater can be replaced with a pipe in which a heating medium flows. In the alternative, the pipe can be used as a cooling means for the molding die, by properly controlling the temperature of the heating medium.

As can be understood from the above discussion, according to the present invention, since two or more powder resin materials having different colours are mixed at a desired mixing ratio to make a single powder mixture and then the powder mixture is loaded in a molding die which is preheated to heat and melt the powder mixture, the molded product has a pepper and salt pattern on its outer surface, in accordance with a mixing state and a mixing ratio, of the powder resin materials. Furthermore, according to the present invention, the pepper and salt pattern can be modified by changing the colour, the grain size, etc., of the powder materials. Accordingly, outer coverings having various patterns on the outer surfaces thereof can be easily manufactured by the present invention.

I claim:

1. A process for manufacturing a molded outer covering, comprising mixing at least two powder resin materials having different colours at a desired mixing ratio to make a single powder mixture, loading the powder mixture in a preheated die, and removing an excess of the powder mixture from the die, and then heating the powder mixture in the preheated molding die to melt the mixture, so that a molded outer covering which has a pepper and salt pattern with different colours on its outer surface is obtained.

2. A process according to claim 1, wherein said powder resin materials are polyvinyl chloride.

3. A process according to claim 1, wherein said powder resin materials are copolymers of polyvinyl chloride..

4. A process according to claim 1, wherein one of said powder resin materials is polyvinyl chloride and the other copolymers of polyvinyl chloride.

5. A process according to claim 1, wherein said powder resin materials have different melting temperatures.

6. A process according to claim 4, wherein the melting temperatures of said powder resin materials are 160° C. to 220° C.

7. A process according to claim 1, wherein said powder resin materials are made of grains having different diameters.

8. A process according to claim 6, wherein the diameters of the grains are 50 to 200 μ.

* * * * *